(12) United States Patent
Melandsø et al.

(10) Patent No.: US 8,453,928 B2
(45) Date of Patent: Jun. 4, 2013

(54) ULTRASONIC IMAGING APPARATUS FOR READING AND DECODING MACHINE-READABLE MATRIX SYMBOLS

(75) Inventors: Frank Melandsø, Kvaløysletta (NO); Tore Baarstad, Lillehammer (NO); Arnt-Børre Salberg, Hamar (NO); Terje Melandsø, Hamar (NO); Eskil Skoglund, Gjøvik (NO)

(73) Assignee: DolphiTech AS, Raufoss (NO)

( * ) Notice: Subject to any disclaimer, the term of this patent is extended or adjusted under 35 U.S.C. 154(b) by 0 days.

(21) Appl. No.: 13/124,200

(22) PCT Filed: Oct. 14, 2009

(86) PCT No.: PCT/NO2009/000360
§ 371 (c)(1),
(2), (4) Date: Jul. 8, 2011

(87) PCT Pub. No.: WO2010/044677
PCT Pub. Date: Apr. 22, 2010

(65) Prior Publication Data
US 2011/0253787 A1 Oct. 20, 2011

(30) Foreign Application Priority Data
Oct. 14, 2008 (EP) .................................... 08166549

(51) Int. Cl.
*G06K 7/00* (2006.01)
(52) U.S. Cl.
USPC ......................................................... 235/439

(58) Field of Classification Search
USPC ......................................................... 235/439
See application file for complete search history.

(56) References Cited

U.S. PATENT DOCUMENTS 5,744,898 A * 4/1998 Smith et al. .................. 310/334
5,773,811 A 6/1998 Schramm, Jr. et al.

FOREIGN PATENT DOCUMENTS

EP 0 460 733 A 12/1991
EP 1 008 863 A 6/2000

OTHER PUBLICATIONS

International Search Report for corresponding International Patent Application No. PCT/NO2009/000360 mailed Apr. 22, 2010.
Takahashi, N. et al. "Image retrieval using spatial intensity features", Signal Processing: Image Communications, vol. 16, 2000, pp. 45-57.

* cited by examiner

*Primary Examiner* — Kristy A Haupt
(74) *Attorney, Agent, or Firm* — Merchant & Gould P.C.

(57) ABSTRACT

There is provided an apparatus and method for reading matrix codes comprising an ultrasound transducer 20 which comprises transmitter and receiver electrodes, a receiver unit 24 connected to the receiver electrodes for processing the signals received by the receiver electrodes, and a transmitter module 21 connected to the transmitter electrodes, the transmitter module transferring an electronic signal to the transducer, where the signal shape is selected between a number of signal shapes according to the characteristics of the matrix code to be read.

25 Claims, 9 Drawing Sheets

Transmitter module

Receiver module

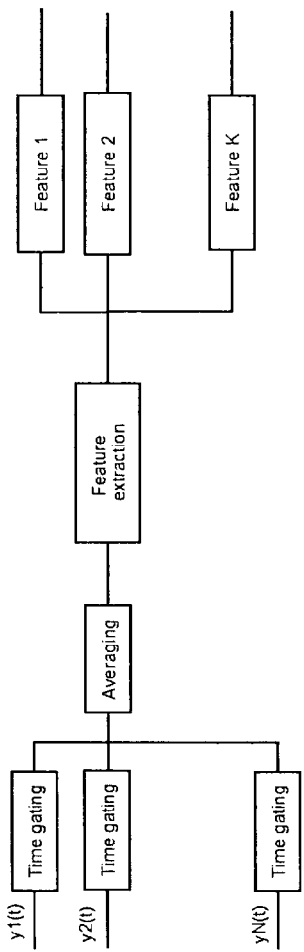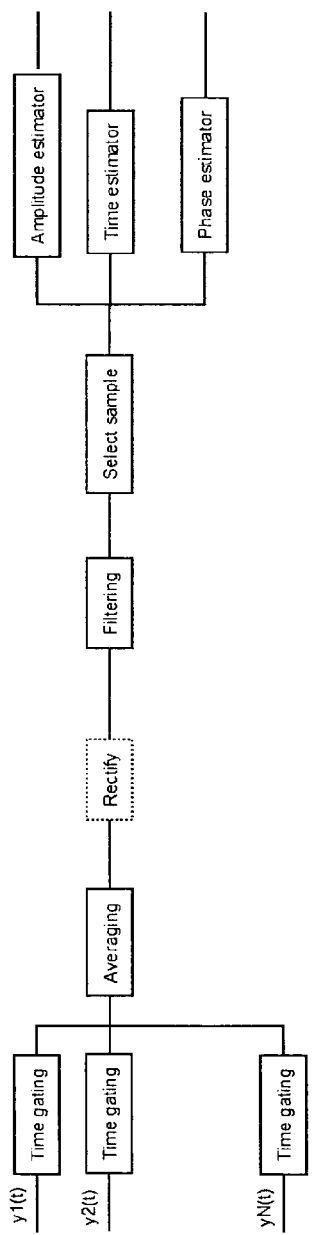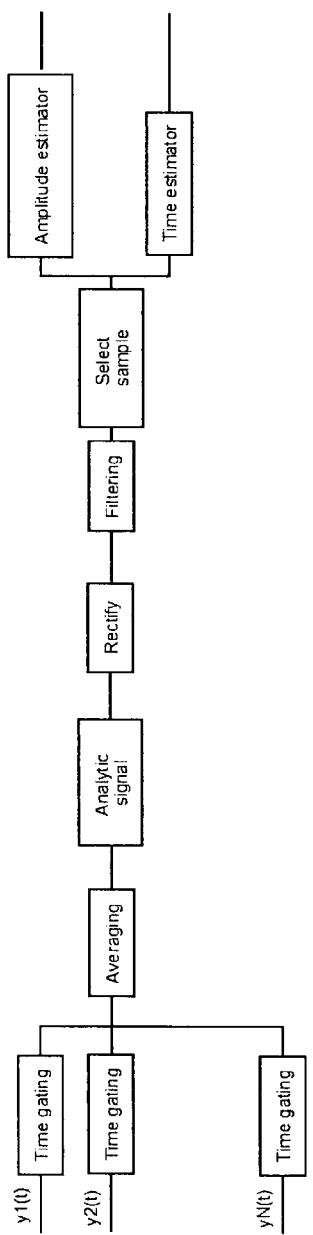

ULTRASONIC IMAGING APPARATUS FOR READING AND DECODING MACHINE-READABLE MATRIX SYMBOLS

This application is a National Stage Application of PCT/NO2009/000360, filed 14 Oct. 2009, which claims benefit of Serial No. 08166549.9, filed 14 Oct. 2008 in the European Patent Office and which applications are incorporated herein by reference. To the extent appropriate, a claim of priority is made to each of the above disclosed applications.

BACKGROUND OF THE INVENTION

Machine readable matrix symbols are a special case of optically scannable symbols which often use circles or square based cells instead of variable widths of spaces and lines, such are used in binary bar codes, to represent the data.

Historically, the automatic identification industry has relied on optical cameras for reading matrix symbols. Optical cameras possess good performance when reading matrix symbols printed on papers or labels, but may have problems when reading matrix symbols that are directly marked on substrates using marking methods such as dot-peen or laser Moreover, when direct marked matrix symbols are painted, the challenge of reading the symbols using optical contrast readers becomes even larger.

Ultrasound as a means of reading matrix symbols is possible if that backscattered ultrasound signal corresponding to the matrix symbol differs from that corresponding to the substrate where the matrix symbol is comprised. This is achieved if the matrix symbol is applied to the substrate using materials with different acoustic impedance properties than the acoustic impedance properties of the substrate, or if the ultrasound propagation time to the matrix symbol is different than to the substrate.

Using ultrasound as a means for reading matrix symbols has been suggested in U.S. Pat. No. 5,733,811. They proposed an apparatus for reading matrix symbols using an ultrasound transducer which is physically scanned by moving it over the component bearing the two-dimensional symbol in a raster pattern.

SUMMARY OF THE INVENTION

The object of the invention is to provide an improved apparatus and method for reading matrix codes/symbols.

The apparatus according to the invention reads the matrix symbol markings using a transducer comprising a plurality of elements that forms the image points/pixels. The matrix symbol is imaged by applying the transducer steady/stationary over the substrate surface. Hence, the principle of reading the matrix symbol is different from U.S. Pat. No. 5,733,811 since no physical movement of the transducer is necessary. There are several benefits of using such imaging method contrary to using a transducer element that physically moves over the substrate containing the matrix symbol. First, the imaging method is potentially much faster since parallelisation is easily implemented by using several transducer elements simultaneously. Second, since there are no mechanical movements involved the imaging is more robust and perfect alignment of the image pixels are always satisfied. Hence, we reduce any potentially geometrical distortions of the imaged matrix symbols. Third, since the transducer contains no physically moving parts it render possible easy use of dry coupling pads. Fourth, since the design of the apparatus uses few connectors to the transducer compared to the number of transducer elements and off the shelf components, the production cost is low.

The object of the invention is to provide an apparatus for reading matrix symbols that enhances features that discriminate the pattern in the matrix symbol.

The apparatus according to the invention further can construct a video stream using features extracted from the received ultrasound signals. By exploiting the transmission scheme and the underlying features, high contrast ultrasound images of the matrix symbol may be constructed. This will provide the potential for reading and decoding a larger selection of matrix symbols.

The object of the invention is achieved by means of the features of the patent claims.

An apparatus according to the invention for reading matrix codes comprises in one embodiment an ultrasound transducer which comprises transmitter and receiver electrodes, a receiver unit connected to the receiver electrodes for processing the signals received by the receiver electrodes, and a transmitter module connected to the transmitter electrodes, the transmitter module transferring an electronic signal to the transducer, where the signal shape is selected between a number of signal shapes according to the characteristics of the matrix code to be read.

In one embodiment the apparatus further comprises a pulse evaluation unit connected to a memory device, the pulse evaluation unit evaluating a number of pulse shapes against N criterions to save the best pulse shape for each criterion in the memory device.

The apparatus may comprise a pulse selection module connected to the transmitter module for selecting one of N pulse shapes for supplying to the transmitter module. The N pulse shapes may be stored in a memory device.

A multiplexer may select one of the N pulse shapes from the memory device.

In one embodiment, there is provided a strategy selector for choosing a strategy for selecting the pulse shape from the memory device.

The strategy may be to select pulse shape automatically or by a user, according to part type.

In one embodiment, the apparatus according to the invention comprises an image construction module connected to the receiver unit, and the pulse selection module is arranged to select signal shapes which provides enhanced images produced by the image construction module.

The pulse selection module may be arranged to select the pulses which provides images with best contrast.

The apparatus according to the invention may also comprise a feature database which comprises a number of image features provided from images generated with a number of different pulse shapes. Information on the pulse shapes associated with the image features may also be stored in the database.

In one embodiment, the apparatus according to the invention comprises an extract features module and a compare module. The extract features module extracts image features from the images produced by the image construction module and the compare module compares the features extracted by the extract features module to the features of feature database and provides the pulse shape associated with the feature of the feature database having the best match to the extracted feature.

In one embodiment, the transmitter and receiver electrodes form a matrix.

The pulse selection module may be incorporated in the transmitter module.

The pulse selection module may be connected to the receiver unit for transmitting information on the transmitted pulse.

The receiver unit comprises in one embodiment a receiver module which comprises at least one multiplexer, an amplifier, and an analogue to digital converter, a receiver control module controlling the multiplexer(s) and a signal processing module.

The signal processing module may in one embodiment be arranged to process the signals from the receiver module and comprise time gating means, averaging means and feature extraction means.

The signal processing module is in one embodiment connected to the pulse selection module in order to use information regarding the signal shapes in the signal processing.

In one embodiment of the apparatus according to the invention, it comprises an image enhancement unit.

The invention may also comprise solutions for connecting a substrate with matrix symbols to various settings of the apparatus. We hereby refer to the "part" as a particular substrate with a matrix symbol marked on it. Since the ultrasound image varies substantially from one substrate and marking method to another, it is important to organize the useful settings of the apparatus. The "part" is thus included in the user interface. A list of parts is stored in the apparatus, for example in the receiver unit. Along with a given part, information about the settings (such as pulse pattern, time gate information, and feature extraction selection) is stored. Hence, when the user selects a given part from the list of parts, the system automatically sets the settings of the apparatus that are stored along with the part.

The user has also the possibility to create its own list of parts by either manually entering the information or by a training functionality that automatically alters the settings of the apparatus and selects the optimal setting for the part.

The information related to a successful decoded matrix symbol is available for the user by means of a configurable data output interface.

The invention will now be described in more detail by means of examples as shown in the enclosed figures.

FIG. 6a-d show example embodiments of transmitter and receiver module.

FIG. 7a-c show different embodiments of the signal processing module.

FIG. 8 shows examples of images produced by the apparatus according to the invention.

Figure 9:
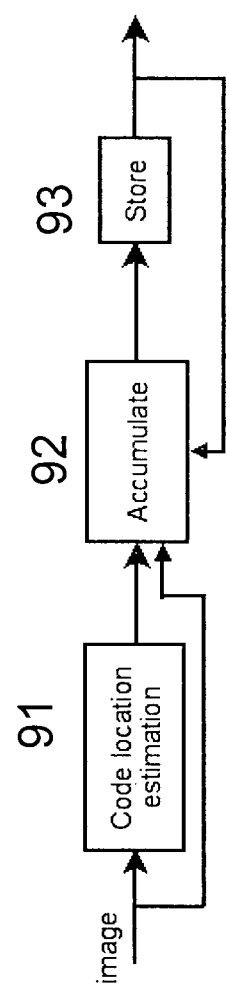

FIG. 9 shows an embodiment of an image enhancement process.

Figure 1:
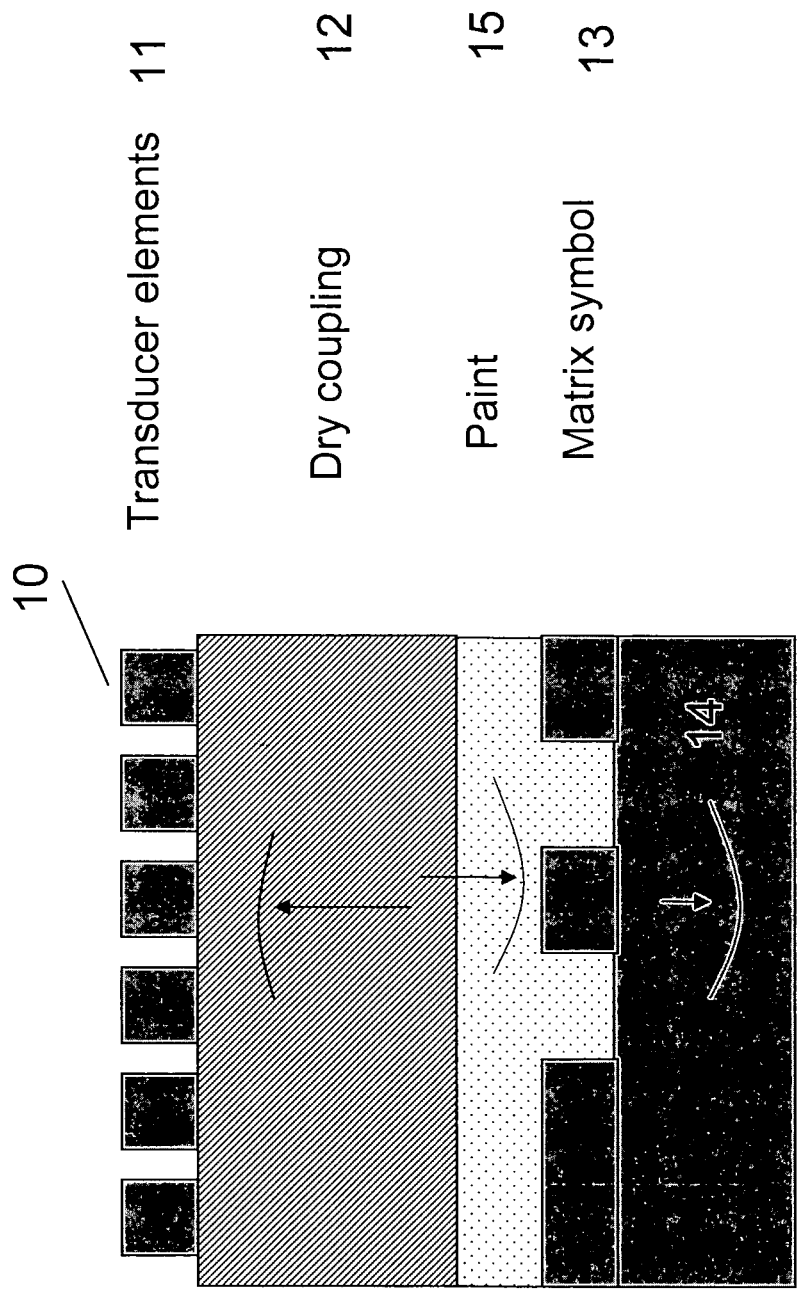
FIG. 1 illustrates the principle of the ultrasound transducer applied in the apparatus according to the invention.

FIG. 1 illustrates the principle of the apparatus 10 according to the invention. An ultrasound transducer comprises transducer elements 11. The transducer elements transmit and receive ultrasound waves towards/from an object 14 which comprises a matrix symbol 13. The matrix symbol may be covered or uncovered. The cover may for example be a layer of paint. The area covered by the matrix symbol is imaged by the ultrasound transducer by altering the transducer elements 11 such that the area covered by substrate hosting the matrix symbol is imaged in a unique manner. The matrix symbol is imaged by applying the transducer stationary over the matrix symbol. In the figure it is used a dry coupling medium which acts as the sound transmission medium for ultrasound energy transmitted and received by the transducer. The coupling medium is needed in order to ensure coupling of the ultrasonic energy generated by the transducer into the substrate where the matrix symbol is comprised, and to provide a distance between the transducer and the matrix code in order to delay the backscattered echo such that it is not received simultaneously as the transducer is transmitting. The coupling medium may be a dry coupling medium or a liquid coupling medium. The apparatus may be used under water, and in that case the water may itself constitute the coupling medium.

A dry coupling is more feasible and easy to use in an industrial environment than a liquid coupling medium. However, the dry coupling needs to be flexible and soft enough such that it adapts to the substrate surface where the matrix symbol is comprised and it need to provide low damping of the ultrasonic signal. These properties may for example be achieved by a dry coupling made of an elastomer.

Figure 2:
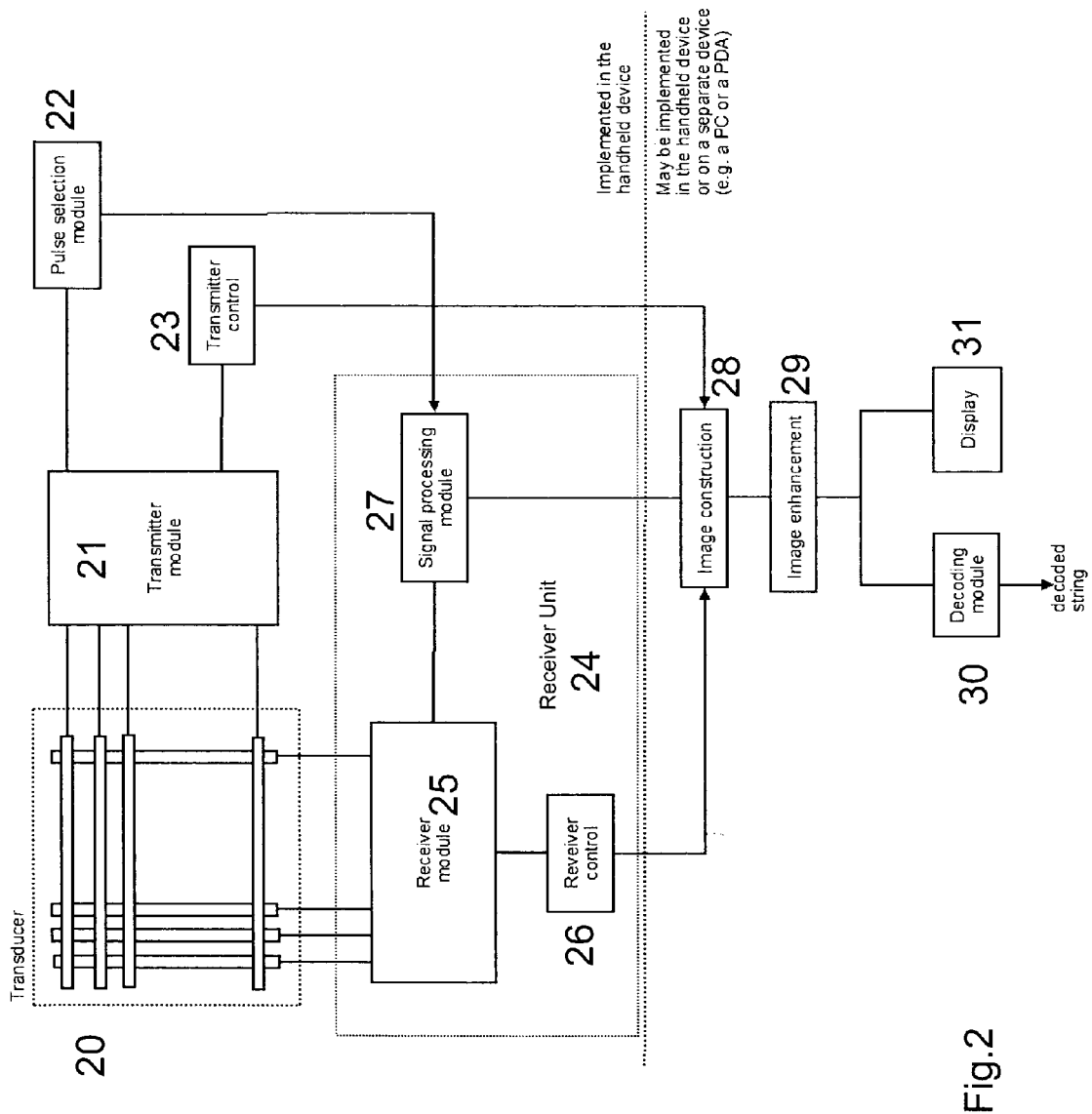
FIG. 2 is a block diagram illustrating the different elements of the apparatus according to the invention.

FIG. 2 is a block diagram illustrating the different elements of the apparatus according to the invention (with one possible embodiment of the transducer). The apparatus comprises a transducer 20, a transmitter module 21, a pulse selection module 22, a transmitter control 23 and a receiver unit 24.

The transducer 20 comprises transmitter and receiver electrodes arranged in an intersecting pattern, where the intersections form a matrix.

In one embodiment of the invention the transducer 20 is built up of a number of elongated, parallel driving electrodes arranged on one surface of a transducer plate and a plurality of parallel receiving electrodes arranged on the opposite surface of the transducer plate. The driving electrodes and the receiving electrodes intersect to effectively form a matrix of individual transducer elements capable of emitting and receiving ultrasonic beams.

In another embodiment of the invention the transducer 20 is built up of a number of elongated, parallel combined driving/receiving electrodes arranged on one surface of a transducer plate and a plurality of parallel grounding electrodes arranged on the opposite surface of the transducer plate. The driving electrodes and the grounding electrodes intersect to effectively form a matrix of individual transducer elements capable of emitting and receiving ultrasonic beams. The emission and reception of ultrasonic beams must be done in separate operations by switching the driving electrodes between a transmit state and a receive state.

In yet another embodiment of the invention the transducer 20 is built up of a number of elongated, parallel driving electrodes on one surface of a transducer plate, parallel receiving electrodes on the same surface of the transducer plate and a grounding plane on the opposite surface of the transducer plate. The driving electrodes and receiving electrodes are organized in such a way to effectively form a matrix of individual transducer elements, e.g. by being orthogonal to each other, capable of emitting and receiving ultrasonic beams. An arrangement of the crossing driving and receiving electrodes in a multilayer structure on e.g. a flexible polyimide circuit will provide the crossing electrode arrangement without electrical contact between the driving and receiving electrodes.

The transmitter electrodes are connected to the output of the transmitter module 21. This module 21 supplies a transmitter pulse pattern with a particular signal shape corresponding to an input pulse to the transmitter electrode selected by the transmitter control 23. The receiver electrodes are connected to the input of the receiver unit 24. The receiver unit 24 comprises in this example a receiver module 25, a receiver control 26 and a signal processing module 27. These modules may in some embodiments be integrated into one module. In other embodiments, the receiver unit 24 may comprise fewer or additional modules. The receiver module 25 senses, amplifies, and samples the signal supplied by a given receiver electrode. Which receiver electrode to handle/process may for example be selected by the receiver control 26. The output of the receiver module is connected to the signal processing module 27 which extracts relevant features from the received ultrasound signals. Examples of such relevant features may be time, amplitude, phase, energy, etc. These features are used to construct ultrasound images of the imaged surface. The signal processing module may also receive information from the pulse selection module 22, such that the most appropriate signal processing algorithm is applied, the processing algorithm being adapted/suited for processing signals originating from a particular pulse pattern/signal shapes.

The signals from the signal processing module 27 represent data that may be used to construct an image of the matrix code. The image construction may be performed in the apparatus, being either a separate module connected to the signal processing module or integrated in the signal processing module. The image construction may comprise image enhancement, either integrated in the image construction step/module or as a separate step/module. In the embodiment of FIG. 2, image construction and image enhancement takes place in separate steps in modules 28 and 29 respectively. Image enhancement increases the probability of a successful decoding. The imaged matrix symbol are then decoded by the decoding module 30, and displayed by the display module 31. The image construction, image enhancement, decoding, and display module may be a part of the apparatus or may optionally be located on an external device, e.g. PC.

The decoding module 30 extracts the matrix symbol bit pattern and decodes it using the appropriate decoding algorithm.

The display module 31 is implemented in order to visualize the imaged substrate surface. This will guide the user to provide faster decoding and selection of the most appropriate processing algorithms.

Pulse Selection Module

Figure 3:
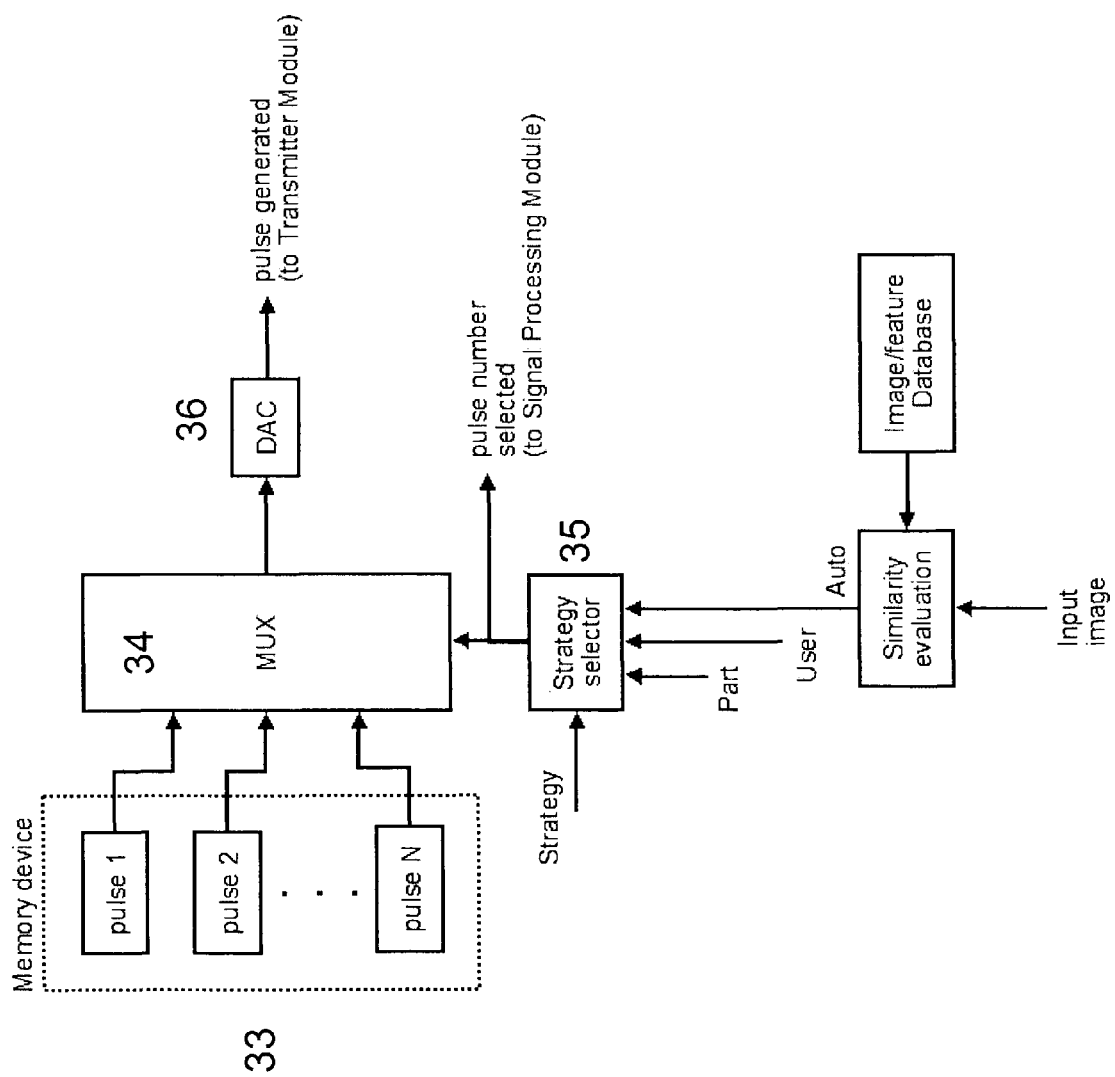
FIG. 3 shows a block diagram of one embodiment of a pulse selection module for use in the apparatus according to the invention.

One embodiment of the pulse selection module 22 is illustrated as a block diagram in FIG. 3. The pulse selection module may comprise or be connected to a pulse generator which supplies the transmitter module with an electronic pulse pattern that will be converted to ultrasonic pulses by the transducer. Information about how to generate N pulse shapes and the pulse shapes themselves is stored in a memory device 33. One of these pulse shapes are selected by a multiplexer 34. The pulse shape that is selected depends on the strategy chosen by a strategy selector 35 and input to the multiplexer. The selected pulse shape is converted to an analogue signal in converter unit 36 to drive the transmitter electrode. The strategy selector is a unit that is either set to keep a fixed strategy, to vary the strategy according to input from a user, or to choose strategy based on internal or external input.

The shape of the pulse pattern is constructed to enhance desired features that will be extracted by the signal processing module and/or the image enhancement module for the particular part. E.g., if the phase image is important to create a high contrast image a pulse shape can be emitted that decreases the probability of selecting a sample corresponding to the wrong phase. If a matrix symbol that is covered by paint is to be imaged, a pulse shape can be chosen that correspond to a short pulse as possible such that the received echoes corresponding to the various layers can be resolved (with respect to time).

In one embodiment of the invention the strategy is to let the user select the pulse shape. In another embodiment the strategy is to let the selected pulse shape to be provided by a part file corresponding to a given matrix symbol. The part files consist of a set of control parameters optimal for the given matrix symbol, including pulse shape suitable for imaging and decoding the symbol, features used in image construction, cell size, code size, paint depth, etc. These control parameters being specific for the type of matrix symbol and substrate (part).

In yet another embodiment of the invention, an automatic pulse shape selection is implemented, where an image provided by the image construction module 28 of FIG. 2 obtained using a reference pulse shape and feature extraction (referred to as input image) is evaluated against a database of matrix symbol images and image features 42. The database consists of matrix symbol images and image features that are obtained from images by using the same reference pulse shape and feature extraction method, and additional information about the pulse shape that provided the best image under some criterion.

Figure 4:
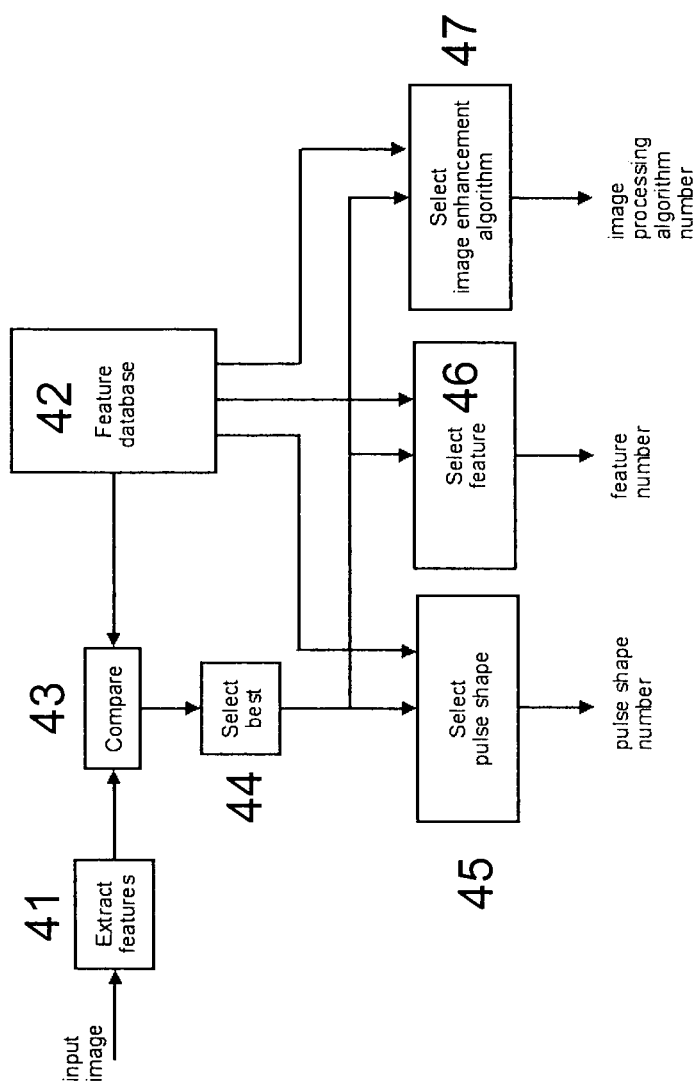
FIG. 4 shows a block diagram of one embodiment of an automatic pulse shape selection.

A block diagram of an embodiment of the automatic pulse shape selection, which may be used in the pulse selection module 22 of FIG. 2 and further described in FIG. 3, is shown in FIG. 4. Image features are extracted from the input image by the Extract features module 41 and compared in the Compare module 43 to corresponding image features stored in a Feature database 42. Each set of image features in the feature database correspond to a given pre-analyzed image, and the image features are extracted using mathematical operations on the image. Since the matrix symbol may be imaged with varying orientation, translation and scale, the features applied need to be orientation, translation and scale invariant. The Select best module 44 select the features from the feature database that represent the best match to the features of the input image, and the corresponding optimal pulse shape is selected by the Select pulse shape module 45. Examples of image features to use are spatial intensity features, spatial texture features, edge features, or combination of features (see e.g. (Takahasi et al, 2000)).

Figure 5:
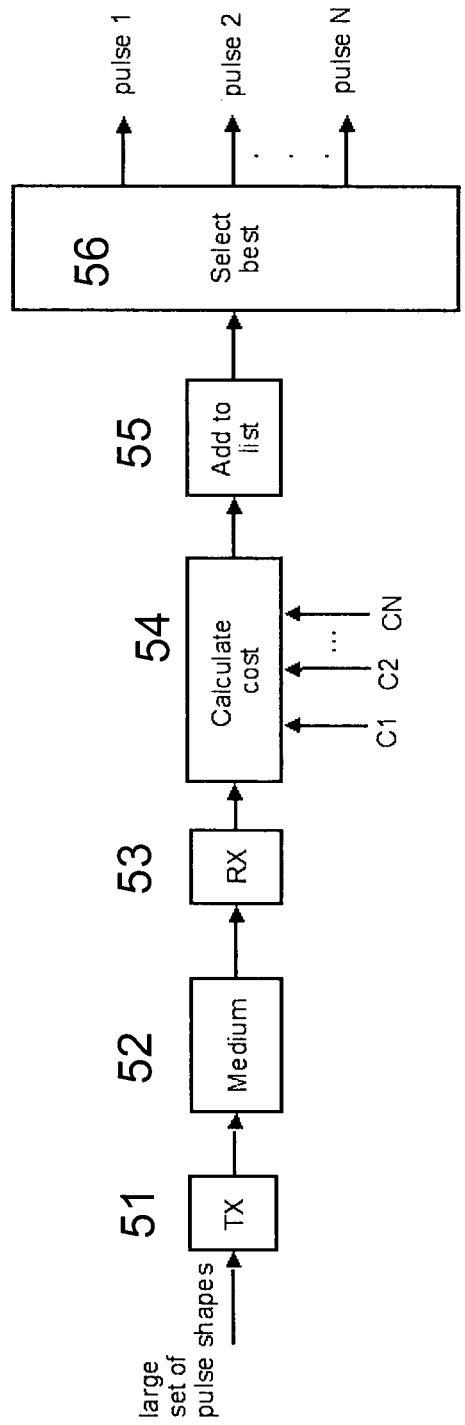
FIG. 5 shows a block diagram of a pulse shape construction algorithm.

To find the pulse shapes to store in the memory device 33 of FIG. 3, mathematical expressions may be used as evaluation criterions. FIG. 5 shows a block diagram of a possible pulse shape construction algorithm which may be embodied in a pulse evaluation unit. The input to the algorithm is a large set of pulse shapes to be evaluated, generated structurally (e.g. all possible pulse shapes in a given time interval supported by the electronics) or random. The corresponding pulses are sent through the transmitter 51, the medium 52 and through the receiver chain 53. Then, the pulse shapes are evaluated against N criterions C1, C2, . . . , CN, in the Calculate cost module 54 which measures the fit of the pulse shapes against the criterions C1, C2, . . . , CN. The calculated performance cost or objective for each pulse shape is then added to a list 55, and the best pulse shapes corresponding to each criterion are selected by the Select best module 56, and we end up with N optimal pulse shapes corresponding to each criterion. Examples of criterions to use are signal-to-noise ratio, main lobe to side lobe ratio, bandwidth, etc.

Transmitter Module

Figure 6A:
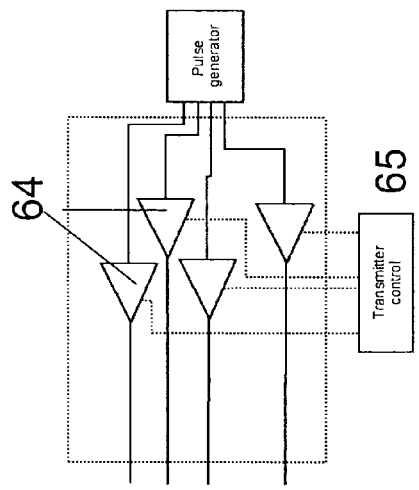

The transmitter module 21 of FIG. 2 is in a simplest embodiment of the invention, shown in FIG. 6a, constructed using a driving amplifier 61 connected to the input of the de-multiplexer 62. A transmitter control 63 selects the transmitter electrode to be excited by altering the address inputs of the de-multiplexer. The transmitter module may be constructed using of-the shelf devices, such as plasma display drivers or ink jet printer drivers.

Figure 6B:
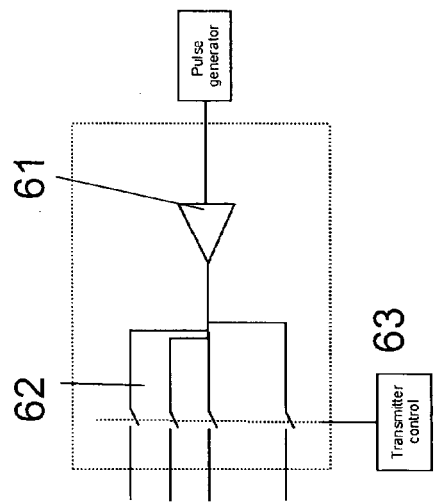

In another embodiment of the transmitter module, shown in FIG. 6b, the transmitter electrodes are each controlled independently, by assigning a driving amplifier 64 to each transmitter electrode. The transmitter control 65 is now designed to control the gain of the amplifiers. This design makes it possible to excite several transmitter electrodes simultaneously, which is needed if transmit beamforming is to be performed.

Receiver Module

The receiver electrodes are connected to a multiplexer in the Receiver module 25 of FIG. 2, which is controlled by the receiver control means 26 (FIG. 2). The output of the multiplexer is connected to a low noise amplifier (LNA), voltage amplifier, and a low-pass filter. The amplified signal is then sampled by an analog-to-digital converter and the digital signal is sent to the signal processing module 27.

Figure 6C:
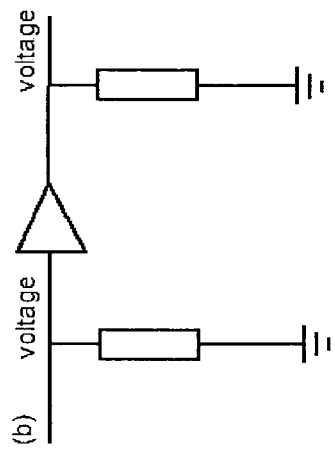

In one embodiment, shown in FIG. 6c, the LNA works as a transimpedance amplifier and is converting the input current to a voltage.

Figure 6D:
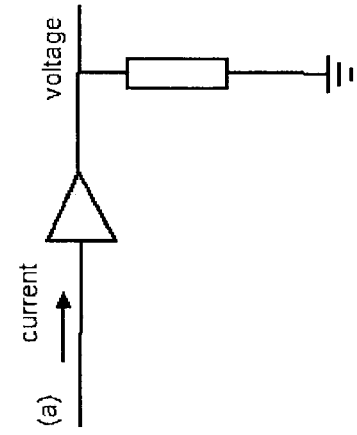

In another embodiment, the input is connected to a resistor, as shown in FIG. 6d, and the voltage across the resistor is amplified by the LNA.

Signal Processing Module

For each element in the ultrasound transducer we have N corresponding digital time series obtained by repeated measurements/operations of the apparatus. Each of these time series is processed by the signal processing module. Typical processing operations include time-gating, averaging the N time series, and feature extraction of the averaged time series (see FIG. 7a). The averaged time series are constructed from multiple recordings from the same electrode, or as the average of several electrodes, or as an average of multiple recordings from multiple electrodes. The features selected are features that discriminate the differences of the backscattered echo corresponding to a matrix symbol and the substrate. Time gating is necessary in order to compensate for the delay introduced by the dry coupling pad and possibly paint layers.

FIG. 7b shows one embodiment of the signal processing module, where the averaged time series are possibly rectified and filtered. A sample of the filtered signal is selected using some criterion (e.g. the maximum value), and the corresponding amplitude, time and phase is the extracted features. These features are particularly useful features to construct an ultrasound image of a matrix symbol. Impedance miss-matches between the matrix symbol and the substrate will be revealed in the amplitude of the backscattered echo pulse. The phase is particular useful for imaging dot-peen or laser marked matrix symbols on metal substrates. This is because matrix symbol will be constructed with "air!" (air will fill the holes made by dot-peen and laser markings) and the impedance of air will be much lower than the impedance of the dry coupling pad. Moreover, the impedance of the substrate will then be much higher than the coupling pad. Hence, one can observe a phase difference of the backscattered pulse corresponding to the matrix symbol and substrate, respectively. The time feature is efficient when the matrix symbol is covered with, e.g. paint and the amplitude of the backscattered signal is the same for the matrix symbol and substrate. Optionally a plurality of "select sample" modules are implemented, each using different criterions to select samples from the time series. E.g. we may select the maximum value, the maximum amplitude value, and the minimum value, and extract the amplitude, time and phase from all theses sample values.

Another embodiment of the signal processing module is shown in FIG. 7c, where the analytic signal (Bracewell, 1986) is constructed and used for further processing. By rectifying the analytic signal the envelope of the backscattered pulse can be obtained. A sample of the envelope signal is selected using some criterion (e.g. the maximum value), and the corresponding amplitude and time are the extracted features. Also for this embodiment several samples may be selected from the envelope signal.

In yet another embodiment of the invention, an automatic signal feature selection is implemented, where an image provided by the Image construction module obtained using a reference pulse shape and feature (referred to as input image) is evaluated against a database of matrix symbol images and image features. The database consists of matrix symbol images and image features that are obtained from images using the same reference pulse shape and feature extraction method, and additional information about the feature extraction method that provided the best image under some criterion. A block diagram of an embodiment of the automatic signal feature selection which may be used in the signal processing module 27 of FIG. 2 is shown in FIG. 4 and is similar to the automatic pulse shape selection procedure described above. Image features are extracted from the input image by the Extract features module 41 and compared against corresponding features stored in a Feature database 42 in the Compare module 43. Each set of image features in the feature database correspond to a given image, and the image features are extracted using mathematical operations on the image. Since the matrix symbol may be imaged with varying orientation, translation and scale, the features applied need to be orientation, translation and scale invariant. The Select best 44 module select the features that provide the best match to the features of the input image, and the corresponding optimal signal feature is selected by the Select feature module 46.

Image Construction

Using the extracted features corresponding to the selected transmitter and receiver electrodes, ultrasound images are constructed in the image construction module 28 of FIG. 2. For example, in the embodiment shown in FIG. 7b, a phase image, time image and an amplitude image is obtained. The constructed images are sent to the image enhancement module 29 of FIG. 2, which may be located on the imaging device or on another device.

Figure 8B:
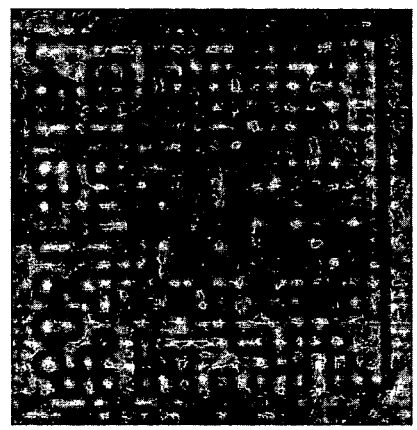
Figure 8A:
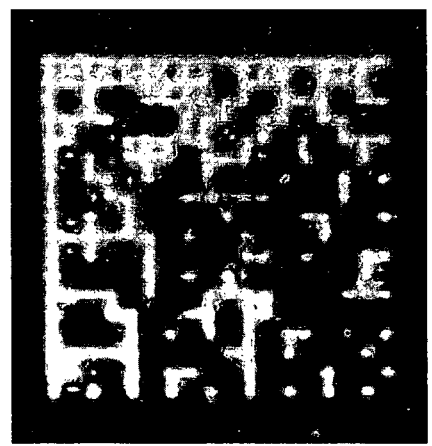

The benefit of using the pulse generation with corresponding signal processing module as suggested above is illustrated in FIG. 8, where we clearly see the increase of contrast achieved using the proposed pulse generation and signal processing algorithms. FIG. 8a shows an image constructed using a pulse generation criterion and corresponding feature extraction that enhances the phase information of the backscattered signals. FIG. 8b shows an image constructed using the energy of the received ultrasound signals alone.

Image Enhancement

The image enhancement module 29 enhances the images such that the probability of a successful decoding is increased. In one embodiment of the invention, the image constructed from one feature is processed and enhanced. In another embodiment, image fusion of the images constructed from the extracted features is applied in order to construct images of the matrix symbol with increased contrast.

In yet another embodiment of the image enhancement module, the ultrasound images are constructed like a puzzle (built up by image fragments) which is useful if one cannot obtain a complete image of the matrix symbol (e.g. it may be marked on a curved surface). An example of a flow of such a function/process is shown in FIG. 9. Using the constructed ultrasound images, the Code location estimation 91 estimate the portion of the image that contain a matrix symbol, and stores the corresponding pixel indices. The corresponding pixel indices in the image to display are updated/accumulated whereas the remaining pixel indices (corresponding to locations with no matrix symbol) are left unchanged.

In yet another embodiment of the image enhancement module, an automatic image enhancement selection is implemented, where an image provided by the Image construction module is evaluated against a database of matrix symbol images/features. The database consists of matrix symbol images/features that are obtained from previously acquired images, and additional information about the image enhancement algorithm that provided the best image under some criterion. A block diagram of an embodiment of the automatic image enhancement selection which may be used corresponds to the automatic pulse shape selection and the automatic signal feature selection described above with reference to FIG. 4. Image features are extracted from the input image by the Extract features module 41 and compared against corresponding features stored in a Feature database 42 in the Compare module 43. This is implemented similarly as in the automatic pulse selection module. Each set of features in the feature database correspond to a given image. Since the matrix symbol may be imaged with varying orientation, translation and scale, the features applied need to be orientation, translation and scale invariant.

The Select best 44 module select the features that provide the best match to the features of the input image, and the corresponding image enhancement algorithm is selected by the Select image enhancement module 47. As in the automatic pulse selection module, examples of image features to use are spatial intensity features, spatial texture features, edge features, or combination of features.

REFERENCES

Bracewell, R; The Fourier Transform and Its Applications, 2nd ed, McGraw-Hill, 1986.

N. Takahashi, M. Iwasaki, T. Kunieda, Y. Wakita, and N. Day, "Image retrieval using spatial intensity features", *Signal Processing: Image Communications*, Vol. 16, pp. 45-67, 2000.

The invention claimed is:

1. Matrix code reading apparatus comprising an ultrasound transducer which comprises transmitter and receiver electrodes, and a receiver unit connected to the receiver electrodes for processing the signals received by the receiver electrodes,
a transmitter module connected to the transmitter electrodes,
a pulse selection module comprising a number of pulse shapes and a number of features corresponding to the pulse shapes,
the transmitter module being connected to the pulse selection module, and is transferring an electronic signal to the transducer, where the signal shape is selected based on the features of the matrix code to be read, and
a pulse evaluation unit connected to a memory device, the pulse evaluation unit evaluating a number of pulse shapes against N criterions to save the best pulse shape for each criterion in the memory device.

2. Apparatus according to claim 1, further comprising a pulse selection module connected to the transmitter module for selecting one of N pulse shapes for supplying to the transmitter module, the N pulse shapes being stored in a memory device.

3. Apparatus according to claim 2, wherein a multiplexer selects one of the N pulse shapes from the memory device.

4. Apparatus according to claim 2, further comprising it comprises a strategy selector for choosing a strategy for selecting the pulse shape from the memory device.

5. Apparatus according to claim 4, wherein the strategy is to select pulse shape automatically or by a user, according to part type.

6. Apparatus according to claim 2, further comprising a feature database comprising a number of image features provided from images generated with a number of different pulse shapes, and information on the pulse shapes associated with the image features in the database.

7. Apparatus according to claim 6, further comprising it comprises an extract features module for extracting image features from the images produced by the image construction module, and a compare module, the compare module comparing the features extracted by the extract features module to the features of feature database and providing the pulse shape associated with the feature of the feature database having the best match to the extracted feature.

8. Apparatus according to claim 2, wherein the signal processing module is connected to the pulse selection module in order to use information regarding the signal shapes in the signal processing.

9. Apparatus according to claim 1, further comprising an image construction module connected to the receiver unit, and that the pulse selection module is arranged to select signal shapes which provides enhanced images produced by the image construction module.

10. Apparatus according to claim 9, wherein the pulse selection module is arranged to select the pulses which provides images with best contrast.

11. Apparatus according to claim 10, wherein the signal processing module is arranged to process the signals from the receiver module and comprises time gating means, averaging means and feature extraction means.

12. Apparatus according to claim 1, wherein the transmitter and receiver electrodes form a matrix.

13. Apparatus according to claim 1, wherein the pulse selection module is incorporated in the transmitter module.

14. Apparatus according to claim 1, wherein the pulse selection module is connected to the receiver unit for transmitting information on the transmitted pulse.

15. Apparatus according to claim 1, wherein the receiver unit comprises a receiver module comprising at least one multiplexer, an amplifier, and an analogue to digital converter, a receiver control module controlling the multiplexer(s) and a signal processing module.

16. Apparatus according to claim 1, further comprising an image enhancement unit.

17. Matrix code reading method by means of an ultrasound transducer which comprises transmitter and receiver electrodes, wherein the method comprises transferring an electronic signal to the transmitter electrodes of transducer, where the signal shape is selected between a number of signal shapes according to the characteristics of the matrix code to be read,
processing signals received by the receiver electrodes in a receiver unit, and
evaluating a number of pulse shapes against N criterions to save the best pulse shape for each criterion in a memory device.

18. Method according to claim 17, further comprising selecting one of N pulse shapes for supplying to the transmitter module, the N pulse shapes being stored in a memory device.

19. Method according to claim 18, wherein a multiplexer selects one of the N pulse shapes from the memory device.

20. Method according to claim 18, wherein a strategy selector chooses a strategy for selecting the pulse shape from the memory device.

21. Method according to claim 20, wherein the strategy is to select pulse shape automatically or by a user, according to part type.

22. Method according to claim 18, further comprising selecting signal shapes which provides enhanced images produced by an image construction module.

23. Method according to claim 22, further comprising selecting the pulses which provides images with best contrast.

24. Method according to claim 18, further comprising providing a feature database comprising a number of image features provided from images generated with a number of different pulse shapes, and information on the pulse shapes associated with the image features in the database.

25. Method according to claim 24, further comprising extracting image features from the images produced by the image construction module, comparing the features extracted by the extract features module to the features of feature database, and providing the pulse shape associated with the feature of the feature database having the best match to the extracted feature.

* * * * *